United States Patent [19]

Mersch

[11] Patent Number: 4,859,861
[45] Date of Patent: Aug. 22, 1989

[54] MEASURING CURVATURE OF TRANSPARENT OR TRANSLUCENT MATERIAL

[75] Inventor: Steve Mersch, Germantown, Ohio

[73] Assignee: Becton, Dickinson and Company, Franklin Lakes, N.J.

[21] Appl. No.: 194,614

[22] Filed: May 16, 1988

[51] Int. Cl.$^4$ .............................................. G01N 21/86
[52] U.S. Cl. .................................... 250/560; 356/382
[58] Field of Search ..................... 250/560, 561, 223 B, 250/235, 225; 356/381, 382, 386, 387, 239, 240

[56] References Cited

U.S. PATENT DOCUMENTS

| | | | |
|---|---|---|---|
| 3,307,446 | 3/1967 | Rottman | 356/382 |
| 4,492,463 | 1/1985 | Marcuse et al. | 356/239 |
| 4,771,181 | 9/1988 | Hayashi | 250/560 |

*Primary Examiner*—David C. Nelms
*Attorney, Agent, or Firm*—Aaron Passman

[57] ABSTRACT

An apparatus and method to determine with a high degree of precision the position of the inside wall of a translucent or transparent tube comprises a laser beam at a wavelength for which the material being measured is transparent or translucent and a directing means for aiming the laser beam toward the tube and normal to the axis of the tube while moving the aimed beam to traversely scan the tube. A light detection means, positioned to receive light polarized normal to the axis of the tube which light, having been reflected by the inside wall and refracted by the tube, causes the detection means to generate signals. The signals are processed to analyze when the light beam is reflected by and when the light is refracted at the inside wall of the tube. The apparatus is also useful in connection with finding the position of the inside wall of curved material of generally uniform thickness. The method includes the steps of aiming a beam of laser light polarized normal to the axis of the tube and intercepting the outside wall of the tube at a height substantially equal to the inside wall and normal to the axis of the tube so that the laser light reflected by or refracted through the inside wall can be detected and related to the transition point between reflection and refraction as a measure of the radius of curvature of the inside wall.

12 Claims, 4 Drawing Sheets

MEASURING CURVATURE OF TRANSPARENT OR TRANSLUCENT MATERIAL

BACKGROUND OF THE INVENTION

1. Field of the Invention

The present invention relates to an apparatus and method for finding the location of the inside wall of a transparent or translucent tube for the purpose of measuring the bore. It also concerns the relationship between light from a laser beam aimed normal to the axis of the tube and toward the inside wall and the consideration of polarized rays reflected and refracted by the inside wall.

2. Background Description

It is important to be able to measure the inside diameter of a transparent or translucent tube in order to manufacture tubing with a consistent bore. It is particularly important that measurements be made with great accuracy and precision in order that the bore diameter be a consistent dimension along the axis of the tube so that the tube bore is uniform. Uniform diameter provides better control of volume inside the tube.

U.S. Pat. No. 3,994,599 shows a method and apparatus for measuring the wall thickness and concentricity of tubular glass articles. The patented method and apparatus uses a beam of coherent light directed toward the tubular glass article so that when portions of the beam are reflected by the inner and outer tube surfaces, the reflected portions converge at a point spaced from the article and the spacing is related to the wall thickness. When a plurality of such beams is directed at circumferentially spaced points, interference fringes are produced and the spacing of the fringes varies at each of the points when there is a lack of concentricity between the outer and inner surfaces of the tube. The laser beam reflections of that patent are used to measure wall thickness and not the bore diameter of the tube. Varying wall thickness is a measure of concentricity and not of the bore diameter at any point or at points along the axis.

U.S. Pat. No. 3,307,446 shows a light source and photo pickup used to gauge the wall thickness of glass tubing as the tubing is being drawn. Again the differences in light reflections from the inner and outer walls of the tube are measured relative to one another to give the wall thickness. This technique is based on the triangulation principle and therefore the resolution of the measurement is limited by the spatial resolution of the detector array and the included angle between light source and detector. The light signals received in this technique are weak, being only interface reflections, and therefore the possibility of interfering signals is high. Also, this technique is not independent of index of refraction changes in the tube being measured. It has also been known to measure holes using light sources and reflection; see, for example, U.S. Pat. Nos. 3,806,252 and 4,690,556. The latter patent shows a method for checking the straightness of an elongated generally cylindrical bore by directing a collimated light beam along the bore with the bore axis skewed slightly with respect to the beam center line. The wall of the bore reflects some of the light beam forming generally an off-axis ring of reflected light beyond the end of the bore and an on-axis spot of unreflected light. Scatter of the reflected light indicates non-straightness of the reflecting bore wall. Rotation of the cylindrical bore through a plurality of positions permits checking the entire circumference.

While that method can be used to check straightness of the bore, diameter and out of roundness, the patented apparatus and method cannot be used for gauging diameter of tubing as it is being drawn as that method requires the laser beam to be directed axially through the bore but skewed slightly relative to the axis.

Measurement of the diameter of a transparent tube during manufacture of the tube is an important factor in the drawing of tubes used for scientific purposes. An apparatus for drawing precision glass tubing from molten glass is disclosed in U.S. Pat. No. 3,401,028. There the glass is heated to a flowable and workable condition for drawing. Prior to cooling the dimensional characteristics of the drawn tube are affected by a device inside the tube which controls the internal dimensions of the tube. The apparatus is used to produce high-precision tubing with uniform dimensions held to diametrical variations of less than 0.5% and preferably of the order of 0.1% or less.

One example of how a precision bore glass capillary tube can be used for scientific purposes is the analysis of blood samples in a quantitative buffy coat centrifugal analyzer. QBC ® is a product sold by Becton Dickinson and Company, Franklin Lakes, N.J. and it includes a capillary tube containing a solid cylindrical plastic float. A patient's blood is drawn into the tube, the tube end is sealed with a plastic cap and the tube spun in a microhematocrit centrifuge for five minutes. During centrifugation the plastic float having a specific gravity that is midway between that of the plasma and the red blood cells floats on top of the red blood cells and is surrounded by the expanded buffy coat. The float occupies more than 90% of the cross-sectional area of the tube and so the buffy coat is expanded ten-fold in the space between the inside wall of the tube and the outside diameter of the float. The individual buffy coat layers can be easily measured. U.S. Pat. Nos. 4,567,754 and 4,190,328 disclose quantitative buffy coat tubes and the background in each patent is instructive on the procedures used to read buffy coat.

The fit between the bore of the capillary tube and the float is important in that particular application. Therefore, the manufacture of the capillary tubing with a precision bore is a primary concern. In the past such tubing manufacture had to rely on a variety of techniques to measure the accuracy of the tubing bore diameter, usually of the finished product. During manufacture the dimensions of the capillary tubing and its respective float had to be checked with a standard calibrating liquid to see that the spread of material captured between the inside wall of the tubing and the outside of the float was as expected. This procedure is cumbersome, slow and difficult to perform accurately. It is of value to be able to use a light source such as provided by a laser, to give an accurate reading of the inside diameter of a precision bore capillary during the tube drawing process.

SUMMARY OF THE INVENTION

The apparatus of the present invention is used to determine the diameter of the bore or radius of curvature of the inside wall of a transparent or translucent tube. Light at a wavelength for which the material being measured is transparent or translucent is aimed toward the tube and normal to the longitudinal axis of the tube by a beam directing means. The beam directing means moves the aimed beam to scan the tube in a direction normal to the longitudinal axis. A light detection means is positioned to receive light polarized normal to the axis of the tube which light has been reflected and refracted by the inside wall of the tube. The light detection means generates signals responsive to the light received. Signal processing means is connected to process signals from the light detection means and to determine the location of the inside wall of the tube by means of analyzing when the laser light reflection off of the inside wall changes to refraction through the inside wall.

In a particular form of the invention the apparatus for finding the diameter of the bore or radius of curvature of the inside wall of a transparent or translucent tube includes a timer in the signal processing means which timer is activated by signals from the light detection means. The timer operates to record when the beam changes from total reflection off the inside wall of the tube to refraction through the inside wall of the tube. In yet another form of the apparatus for finding the radius of curvature of the inside wall of a transparent or translucent tube a scanning means is part of the directing means for aiming the laser beam toward the tube. The scanning means causes the laser beam to traverse the tube normal to the tube axis producing patterns of reflected and refracted light rays. The patterns produced are measurably changed by reflection off of the inside wall of the laser light as a result of the topography of the inside wall.

In yet a more specific form of the preferred embodiment, the signal processing means analyzes fringe patterns of overlapping fans of the laser light produced by the scanning means and detected by the detection means. The constructive and destructive interference of the reflected and refracted laser light rays can be used to measure the radius of curvature of the inside wall of the tube.

Another embodiment of the invention includes in an instrument for finding the radius of curvature about an axis of the inside wall of a material which is transparent or translucent to certain wavelengths of polarized light. A light beam polarized normal to the axis of the material and at a wavelength for which the material is transparent or translucent, is aimed along a path normal to the axis of the curved material by directing means. Movement means associated with at least the curved material or the beam directing means causes the path of the light beam to traverse the curved material in a direction normal to the longitudinal axis. Movement of the beam relative to the curved material changes the optical influence of the curved material upon the light from total reflection off the inside wall to refraction through the inside wall of the curved material. When the aimed beam intercepts the outside wall of the curved material at a height substantially equal to the height of the inside wall, a measurable optical influence results in the reflected rays. The optical influence is indicative of the height of the inside wall.

Another aspect of the invention is a method for finding the radius of curvature of the inside wall of a transparent or translucent tubular member. The method steps include aiming a beam of light for intercepting the outside wall of the tubular member around a height substantially equal to the height of the inside wall. A further step in the method includes detecting when the light beam polarized normal to the axis of the tubular member changes from being totally reflected by the inside wall of the tubular member to refraction through the inside wall of the tubular member. A final step in the method is relating the transition point from reflection to refraction to the height of the inside wall of the tubular member.

A more specific method for finding the radius of curvature of the inside wall of the tubular member may include the added steps of moving at least the beam of light or the tubular member axially relative to the other for determining the height of the inside wall at various positions relative to the longitudinal axis of the tubular member. A still further refinement of the method of finding the diameter across the inside wall of the tubular member can include the additional step of moving at least the beam of light normal to the longitudinal axis of the tubular member or the light beam or tubular member traversely to one another so the beam of light intercepts the tubular member at diametrically opposed points and produces signals spread apart in time for each transition point. A still further refinement of that method step can include the additional step of producing a signal at the time when the transition point is detected.

Yet another form of the method entails the forming of a tubular member by drawing the tubular member from a molten bath of workable and flowable material with the following steps of aiming a beam of light to intercept the outside wall of the tubular member at a height equal to the height of the inside wall. Then detecting when the light beam polarized normal to the axis of the tubular member changes from being reflected by the inside wall to being refracted through the inside wall and finally, relating the transition point between reflection and refraction to the height of the inside wall. A tubular member produced in accordance with the foregoing method is also a part of the invention.

The advantages of the invention permit the measurement of a tube diameter without physical contact and without interruption of the normal handling of the tube during manufacture. The tube can be examined without having to be optically measured along its axis and without concern for the material of the tube. The optical effect employed in this invention produces a strong signal resulting in a highly accurate, robust and fast instrument. Measurements of concentricity and ellipticity of the bore can also be made employing this invention as well as detection of defects in the tubular member.

DETAILED DESCRIPTION

While this invention is satisfied by embodiments in many different forms, there is shown in the drawings and will be described in detail several preferred embodiments of the invention with the understanding that the present disclosure is to be considered as exemplary of the principles of the invention and is not intended to limit the invention to the embodiments illustrated. The scope of the invention will be measured by the appended claims and their equivalents.

The theoretical basis for the invention of this specification rests on the concept that a laser beam entering any transparent or translucent tube at a height equal to the internal radius would encounter the transition from internal reflection off the inside wall to refraction across the inside wall. Moreover, that phenomenon is entirely independent of index of refraction and/or wall thickness. In situations where the outside diameter of the tube and the inside diameter of the tube are not concentric, the wall of the tube may form a lens and could introduce optical magnification such that the relationship between the beam height and the inside diameter may no longer be constant. Similarly, where the tube is elliptical in cross-section and is not circular or coaxial, the wall could act as a lens such that the inside diameter may be dependent upon tube orientation relative to its axis. Furthermore, irregularity such as flat spots, pimples or abrasions on the inside or the outside of the tube, which extend for some distance along the tube, may each influence the accuracy of the location of the inside diameter.

It is clear however that in the circumstance where the tube has relatively concentric walls that are substantially coaxial, the apparatus and method disclosed herein will give an accurate reading of the inside diameter and can readily be used in a tube drawing manufacturing process while the process is in operation. The level of accuracy at which the apparatus and method seek to measure is such that the aforementioned tubing defects will immediately and significantly change the measured parameter indicating that the inside diameter is no longer that of a generally coaxially concentric circular tube free from manufacturing defects. Consequently, once the apparatus has been calibrated and a range of acceptable values defined, the measurement of bore diameters within the defined values can be considered correct.

The concentricity and/or ellipticity of a tubular member can be determined using this invention by making at least four measurements of inside diameter and outside diameter at four equally spaced apart locations about the circumference of the tube. Processing these measurements will yield an accurate determination of inside diameter, outside diameter, concentricity and ellipticity.

Figure 1:
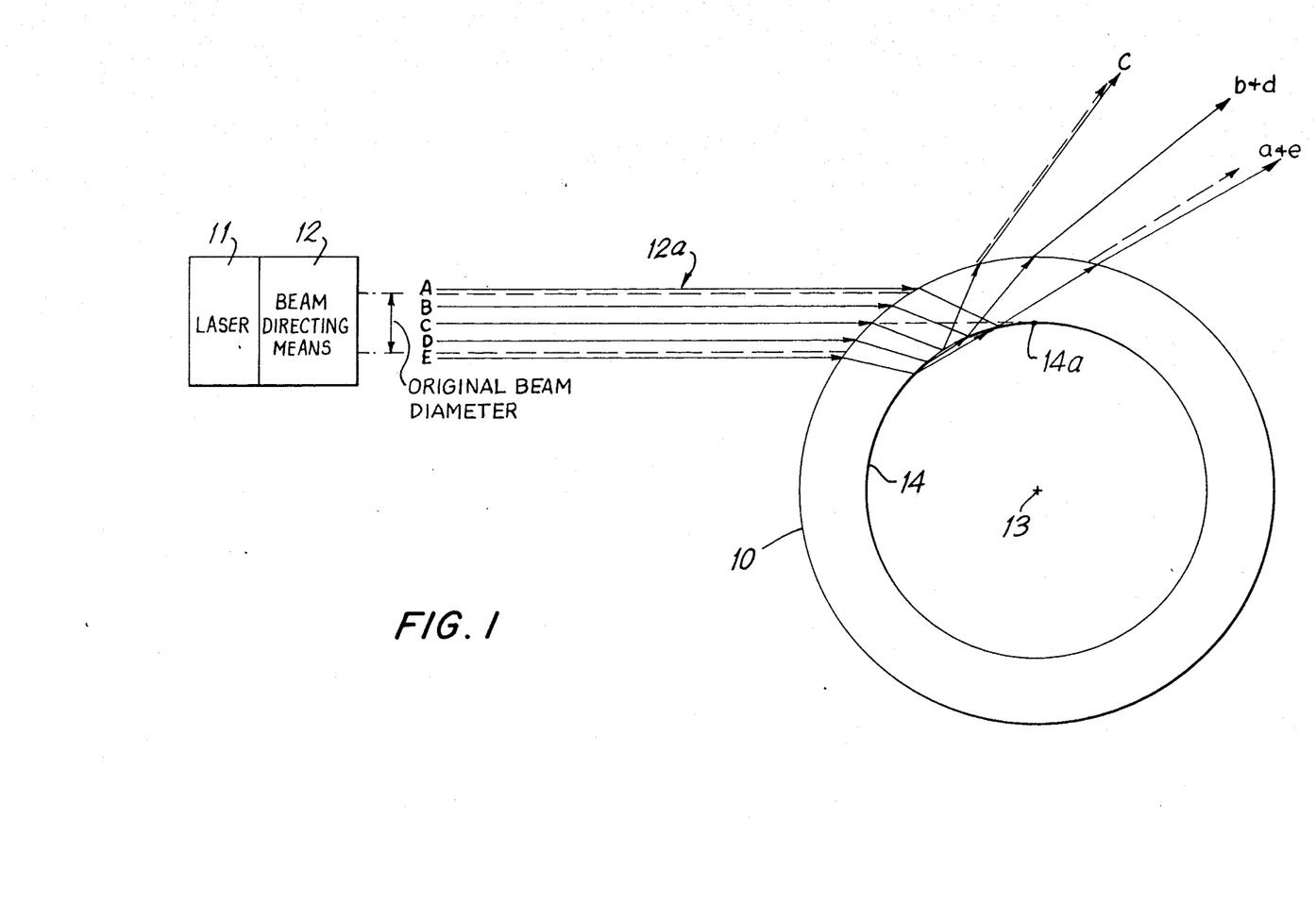
FIG. 1 is a schematic representation of a laser beam scan of a transparent tube with its longitudinal axis normal to the path of the laser beam showing the ray traces of the reflection of the laser beam off of the inside wall and the change of the reflected ray trace caused by the transition from total internal reflection to refraction as the laser beam passes through the inside wall of the tube.

With the foregoing in mind FIG. 1 is a schematic illustration of what happens to a scanning laser beam aimed normal to the axis of the tube as the beam passes through the outside wall of the glass tube and is reflected and refracted through the tube. The transparent and translucent tube is generally designated 10 and a laser 11 provides a beam, of a diameter preferably about 0.010 inches or 0.254 mm, to a beam directing scanner 12. Scanner 12 aims the beam 12a in a direction generally normal to an axis 13 of the tube 10. The laser beam diameters can vary, for example, a smaller diameter perhaps down to 0.003 inches or 0.0762 millimeters will give greater resolution, that is the sharpness of the peak detected. Larger laser beam diameters up to about 0.05 inches or 1.27 millimeters will enable the location of the tube being measured to vary some with respect to the direction the beam is aimed without affecting the ability of the beam to measure the inside wall of the tube.

Individual beam positions of the scanning beam 12a are designated in FIG. 1 as "A", "B", "C", "D" and "E". A horizontal arrow is shown with respect to the center line of each of the beam positions "A" through "E" and represents the axis of the scanning laser beam at each respective position. The dashed lines in FIG. 1 represent the size of the laser beam centered on the arrow C. Lower case letters "a" through "e" are used to designate the resulting output rays and each corresponding ray has the same letter as its input beam. Consequently, and for example, the input beam along path "A" will result in an output ray "a" as shown in FIG. 1. On the schematic illustration of FIG. 1, the preferred laser beam diameter is 0.010 inches or 0.254 mm and is shown by dashed lines positioned just inside beams "A" and "E" and nearly along the same path as rays "a" and "e".

The scanning laser beam "A" through "E" causes the resulting output rays "a" through "e" to sweep out overlapping arcs as a result of the total internal reflection of light off and the refraction of light through inside wall 14 of the tube 10. The sweep or pattern of the resulting arcs of the scanning beam are important to locating inside wall 14 of the tube 10. Rays "a" and "b" are total internally reflected off the inside wall, ray "c" is at the critical angle for reflection off the inside wall, and rays "d" and "e" are not reflected off the inside wall but rather refract through the bore of the tube. Consequently, the sweep pattern of the reflected rays "a" through "c" are overlapped by refracted rays "c" through "e" thereby creating the overlapping arcs.

Any tube of a known inside diameter can be used as a calibrating means to relate the angular position of the output or resultant ray "c" obtained when the height of the input ray is exactly equal to the height of the inside wall 14. The location of the inside wall 14a can be determined by positioning a detector means in the form of a photo cell, photomultiplier or the like along with a lens and/or filter if desired in the general location of ray "c". The positioning of the detector means is limited at one extreme in that it can be at no greater inclination than ray "c" such that it would detect no light at all, and at the other extreme in that the output from the detector must satisfy the signal processing means. The reasoning behind this positioning tolerance also applies to the positioning tolerance of the tube being measured.

The light from laser 11 has to be polarized normal to the axis of the tube 10 and has to be at a wavelength for which the material of the tube 10 is transparent or translucent. The light directing means 12 optimally is capable of scanning the tube wall in all directions which are normal to the axis 13 of the tube 10 and at least in the area surrounding the position where the height of the laser beam is equal to the height of the inside wall 14 of the tube 10.

Figure 2:
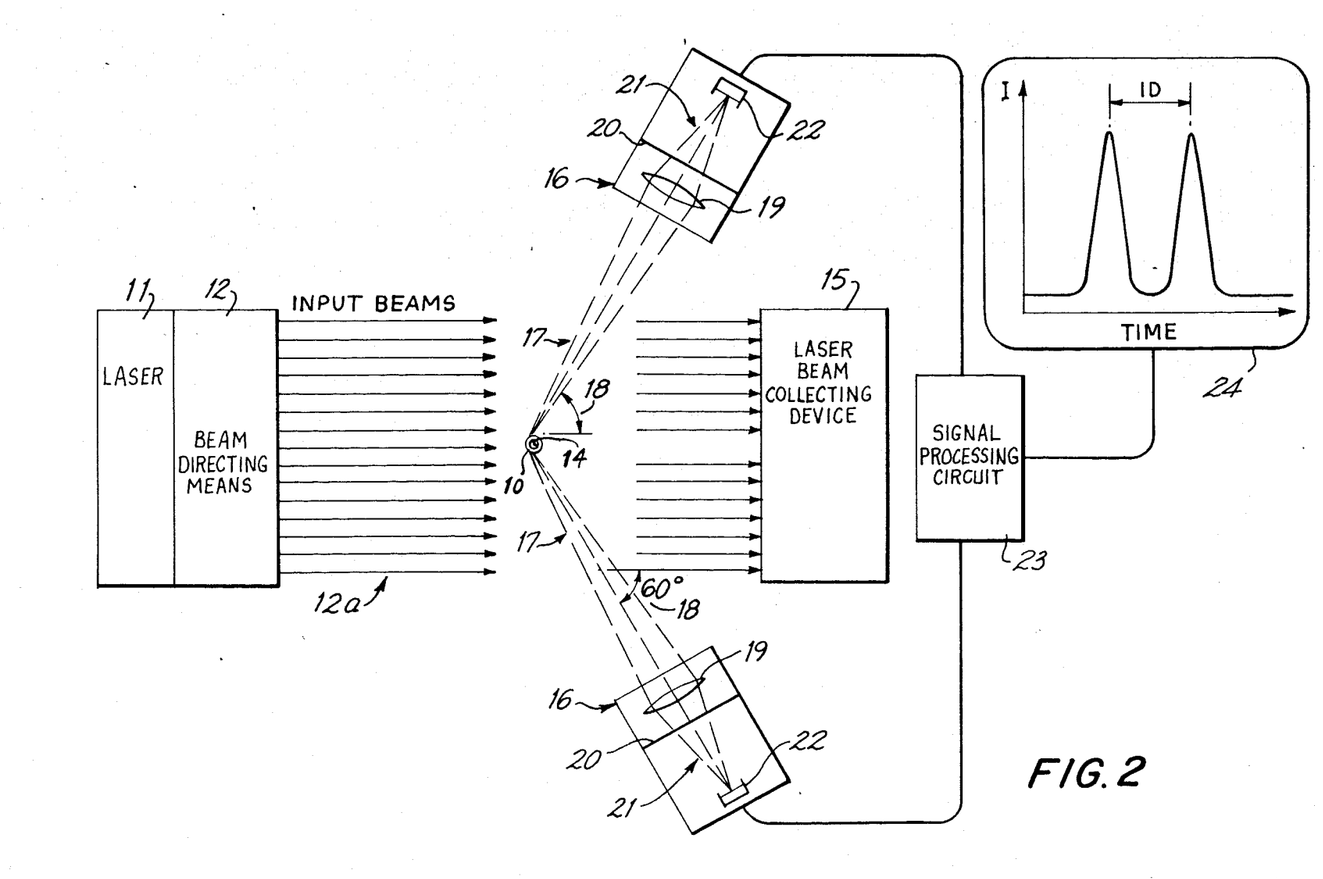
FIG. 2 shows a schematic side view of a scanning laser beam with detectors positioned to receive the reflected/refracted laser light from the tube inside wall of diametrically opposed points where the laser beam height is equal to the height of the inside wall.

FIG. 2 shows a schematic side view of the scanning laser apparatus in connection with detectors positioned to receive the light that is reflected/refracted by the inside wall of the tube 10. In FIG. 2 the laser 11 and the light directing means 12 are essentially the same as shown and described in connection with FIG. 1. The scanning by the beam directing means 12 completely traverses the tube 10 producing a series of beams from an area clearly above the highest outside diameter of the tube 10 to an area clearly below the lowest outside diameter of the tube 10. The orientation shown and described in connection with FIG. 2 is vertical, i.e., up and down; high and low and the scanning beams are horizontal, this need not be the required arrangement for any application of the invention. It can be appreciated that the laser 11 and directing means 12 can be aimed at the tube 10 from any direction so long as the beams 12a from the laser 11, which strike the tube 10, are normal to the axis 13 of the tube 10.

A conventional laser micrometer includes a laser 11, a beam directing means 12 and a laser beam collecting device 15 which can be used to indicate the outer diameter of the tube 10 which diameter is needed in determining eccentricity and ellipticity. It can be seen that the beams which intersect the tube 10 result in output rays reflected/refracted through the tube 10 as shown in FIG. 1.

A light detection arrangement 16 is provided to receive a bundle of rays 17 of reflected/refracted light from tube 10. The center line of the light detection arrangement 16 is at an an angle that is about 60 degrees relative to the horizontal orientation of the laser directing means scanning beams. The invention is not limited to 60° which is shown and generally designated 18 in FIG. 2. The bundle of rays 17 are first collected by a lens 19 in the light detection arrangment 16 and concentrated before they pass through a polarizing filter 20. The focused rays of bundle 17 are generally designated as 21 and are reduced to a polarized spot of light which lands on a detector 22. Polarizing filter 20 is only required if the laser light is not initially polarized normal to the axis 13 of the tube 10. The lens 19 is required only if the detector area is small and therefore light concentration is necessary. Using the polarizing filter 20 provides the additional benefit of permitting the outside diameter of the tube 10 to be measured by means of a laser micrometer gauge comprising the scanning beam and the collector 15. The outside diameter measurement is necessary for concentricity and ellipticity determination. If the laser micrometer measurement is unnecessary, then the laser 11 can be polarized and no filtering is required.

In FIG. 2 there is one bundle 17 of reflected/refracted rays representative of the location of the upper inside wall 14 and another bundle 17 for the location of the lower inside wall 14 of the tube 10. Therefore, there are two detectors each labeled 22, one to receive each of these distinct bundles 17 of reflected/refracted rays. Each detector 22 is positioned to receive the light from the transition ray which results when the scanning beam height is equal to the inside wall height. Each of the detectors 22 is connected to a signal processing circuit 23 which is designed to relate the frequency of the scanning caused by the laser beam directing means 12 to the timing of the signal from each of the detectors 22.

In particular, when the laser input beams 12a scan across the upper part of tube 10 and reach the inside wall 14, the upper bundle 17 of reflected/refracted rays produce a spot of light on detector 22. The peak signal produced when the center of laser beam 12a is at a height equal to the height of the wall 14 is identifiable. Detector 22 generates a signal in the form of a voltage peak. The time of that voltage peak is stored in the signal processing circuit 23. Similarly, when the input beams 12a reach the lower inside wall 14 of the tube 10 another bundle 17 of reflected/refracted rays pass to the other detector 22 and produce another peak electrical signal which is similarly stored in the signal processing circuit 23. The time span between the first or upper peak signal and the second or lower peak signal is indicated by an oscilliscope trace 24 as the inside diameter, ID. The pair of signal peaks, representative of the signals during a scan, are received by circuit 23, one from each detector 22, and can be analyzed to give an accurate measurement of the inside diameter of the tube 10.

This apparatus can be calibrated using a tube of a known inside diameter and the expected tolerance for the acceptable range of inside diameters can be preselected for the tubing being drawn. Suitable feedback mechanisms and signaling devices can be incorporated into the circuit 23 to produce an apparatus which will work in connection with tube drawing equipment to control the bore dimension by changing drawing equipment parameters.

Figure 3:
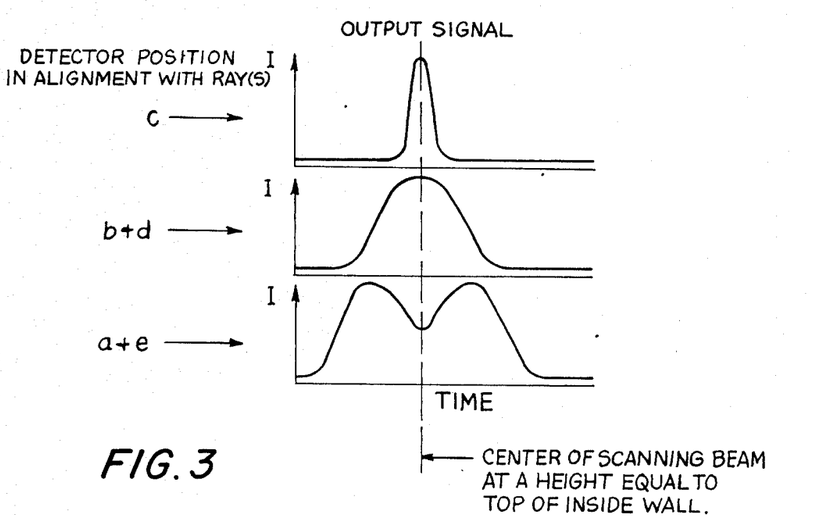
FIG. 3 shows a series of output signals produced by a detector located at the three indicated positions as a result of the reflected/refracted light rays detected.

FIG. 3 shows a series of output signals produced by one detector 22 of FIG. 2 and those signals result from the detected light of the bundle 17 reflected/refracted rays and are indicative of the change in the signal obtained as a function of detector position. In FIG. 1 the resulting rays "a" through "e" represent the overlapping arcs of reflected/refracted rays due to the scanning beam "A" through "E".

The graphs of FIG. 3 for the detector signals are important to the positioning of the detector 22 and are significant to the location of the tube 10 relative to the scan directing means 12. The relative positioning and positioning tolerances of the detector 22 and tube 10 are limited only by the ability to determine from the output of the detector precisely when the center of the scanning beam is at the height equal to the location of the top of the inside wall. To understand how this relates to FIG. 3 it is necessary to understand what is happening at each detector position. First consider the detector position in alignment with the center of ray "a". As the beam of some fixed size is scanned through the tube 10, a fan starts to sweep from horizontal toward vertical due to total internal reflection off the inside wall 14. Therefore, the first detector position to start producing a signal is ray "a". This can be seen on the bottom of the output signal graphs in FIG. 3. As the input beam continues its scan, the detector alignment with ray "b" and finally ray "c" each start producing a signal. However, once the scanning beam starts moving below the height of the top of the inside diameter the effect changes from total internal reflection to refraction at the wall and the fan abruptly changes direction and the fan of rays starts back towards the horizontal. Therefore, the first detector position to cease producing a signal will be the position in alignment with ray "c", the next position will be in alignment with ray "b" and the last position being in alignment with ray "a".

The scanning beam is a finite size and the light detection arrangement 16 has some finite spatial aperature.

As the detector position is moved toward the horizontal, the output signal will continue to widen until the center starts to invert and two separate pulses become visible, see FIG. 3 where the output at detector position in alignment with rays "a" and "e". The first signal pulse from the up sweeping fan is due to total internal reflection, and the second signal pulse from the down sweeping fan is due to refraction through the bore. It follows that as the input beam gets smaller, the output signal becomes a double pulse at a more vertical detector position. It should be clear that the peak of the single pulse of the output signal of the detector aligned with ray "c" corresponds to the instant in time when the center of the scanning beam is at a height equal to the top of the inside wall 14 of the tube 10. The ability to precisely determine that instant in time from the detector's output signal determines the measurement accuracy of the invention. The sharper the spike of the output signal, the easier that determination is. It should be appreciated however that a measurement can be made with the detector at any of the three positions. The signal processing circuit 23 may be designed to handle such output signals.

It should be realized that measurement resolution and detector positioning requirements are tradeoffs. That is, a small diameter scanning beam produces sharply spiked output signals which provide the precision measurements. The desire to have wide tolerances for positioning of tube 10 relative to the detector alignment would require the use of a larger diameter scanning beam to avoid the inverted peak shown at detector position in alignment with rays "a" and "e" and acceptability of not so sharply spiked signals. With electronic technology currently available measurement precision of 0.00001" are achievable with the techniques described for using this invention.

The detector output signal received is strong, having a very high signal to noise ratio, and is highly accurate. By obtaining two signals as described and shown in FIG. 2, the timed difference between the two signals is indicative of the inside diameter of the tube. In particular, one signal is generated when the scanning beam is at the height of the inside wall 14 and the other is generated when the scanning beam is at the depth of the inside wall 14. A timer in the signal processing circuit 23 can be used to periodically measure the timed difference between the pair of output signal peaks derived from the upper and lower inside walls 14 of the tube 10.

Figure 4:
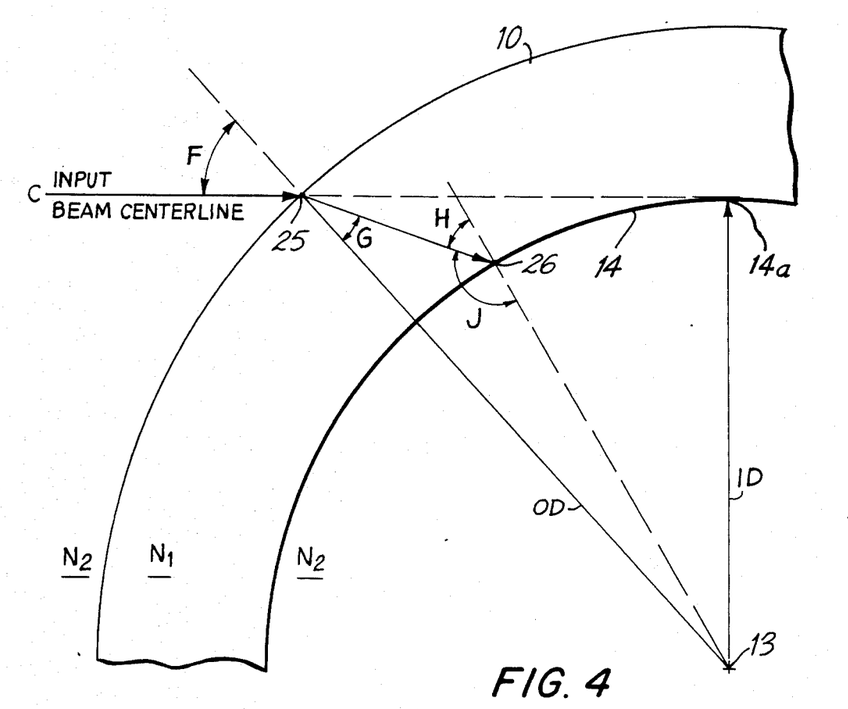
FIG. 4 shows an enlarged tube section wherein the laser beam enters the tube wall at the height equal to the height of the inside diameter of the tube.

FIG. 4 shows the schematic relationship between the laser beam "C" relative to the inside wall of the tube 10. Parameters, needed to prove that the transition point between total reflection off and refraction through the inside wall of the tube measures the position of the inside wall apart from wall thickness, are shown. $N_1$ is the index of refraction for the material of the wall of the tube 10 and $N_2$ is the index of refraction for the air surrounding and inside the tube 10. Also shown in FIG. 4 is the angular relationship of the refraction of beam "C" by the wall of the tube 10. As shown in FIG. 1 all beams entering parallel to and above the entering beam "C" will be totally internally reflected off the inside wall 14 and those below the entering beam "C" will be refracted through the inside wall 14 into the cavity of the tube 10. In FIG. 4 the entering beam "C" comes from the left on the horizontal and at the height of the inside wall 14 at its uppermost point 14a. The beam "C" is refracted by the tube 10 at an angle G relative to the radius from the tube axis 13 to the point 25 on the outside of the tube 10 where the beam "C" enters. The acute angle F is between the entering beam "C" and the extension of the radius through point 25. The refracted beam "C" passes through the outside wall of tube 10 to a point 26 on the inside wall 14. The obtuse angle J is between a radius from axis 13 to point 26 and refracted beam "C". The complimentary angle to angle J is angle H as shown in FIG. 4.

These angles are necessary for use in the mathematical proof that the relationship of the reflected ray "c" and the transition point, at 14a, are independence of the index of refraction, wall thickness and outside diameter.

At the point where the input ray is equal in height to the ID, the following relationship exists:

$$\text{Angle } F = 90° - \text{ARCCOS} \frac{ID}{OD} \quad \text{(Eq. 1)}$$

Using Snell's Law that the ratio of sines, of the angles of incidence and refraction, is a constant $$N_2 \text{ SIN} \left( 90° - \text{ARCCOS} \frac{ID}{OD} \right) = N_1 \text{ SIN } G \quad \text{(Eq. 2)}$$

Using trigonometric identity $$J = \text{ARCSIN} \left( \frac{OD}{ID} \text{ SIN } G \right) \quad \text{(Eq. 3)}$$

$$H = 180° - \text{ARCSIN} \left( \frac{OD}{ID} \text{ SIN } G \right)$$

$$\text{SIN } (180° - H) = \frac{OD}{ID} \text{ SIN } G$$

Substituting for SIN G from Eq. 2 into Eq. 3

$$\text{SIN } (180° - H) = \frac{OD}{ID} \frac{N_2}{N_1} \text{ SIN} \left( 90° - \text{ARCCOS} \frac{ID}{OD} \right)$$

$$\text{SIN } 180° \text{ COS } H - \text{COS } 180° \text{ SIN } H =$$

$$\frac{OD}{ID} \frac{N_2}{N_1} \left[ \text{SIN } 90° \text{ COS} \left( \text{ARCCOS} \frac{ID}{OD} \right) - \right.$$

$$\left. \text{COS } 90° \text{ SIN} \left( \text{ARCCOS} \frac{ID}{OD} \right) \right]$$

Simplifying by substituting COS 180° = 1; SIN 90° = 1; COS 90° = 0 and SIN 180° = 0

$$\text{SIN } H = \frac{OD}{ID} \frac{N_2}{N_1} \text{ COS} \left( \text{ARCCOS} \frac{ID}{OD} \right)$$

$$\text{SIN } H = \frac{OD}{ID} \frac{N_2}{N_1} \frac{ID}{OD}$$

Consequently, the critical angle requirement $$\text{SIN } H \frac{N_2}{N_1}$$

Therefor H = the critical angle.

The foregoing proof is the mathematical verification that the transition point at 14a between total internal reflection off the inside wall and refraction through the inside wall 14 of the tube 10 occurs at a point above the axis 13 of the tube 10 equal to the radius of the bore. As shown in FIG. 4 the significance of this relationship is that it would appear to remain independent of the outside diameter variations, wall thickness variations and index of refraction variations. As a result of this, the measurement of the inside diameter can be performed quickly, accurately and precisely without mechanically contacting the tube.

While the preferred embodiment that is shown and described is a laser gauge based technique an interferometric technique can also be used to analyze the interference patterns generated as a result of the reflection from and the refraction through the inside wall 14. That is to say that the two fans of light, one resulting from reflection off the inside wall and the other resulting from refraction through the bore overlap in spaces and create an interference pattern that can be analyzed to determine the radius of curvature of the inside wall. The bundle of rays 17 in FIG. 2 would be used for interferometry, however the beam should be about 0.05 inches or 1.27 mm diameter in order to simultaneously generate the two overlapping fans. The measurement of the radius of curvature of the inside wall 14 is made possible because the bundle of rays 17 contains the reflected wavefront and the refracted wavefront (which is considered the reference wavefront). Those rays overlap to form a measurable light pattern of constructive and destructive straight line interference fringes. In the technique of laser interferometry, only one side of the tube 10 need be inspected.

Figures 5, 6:
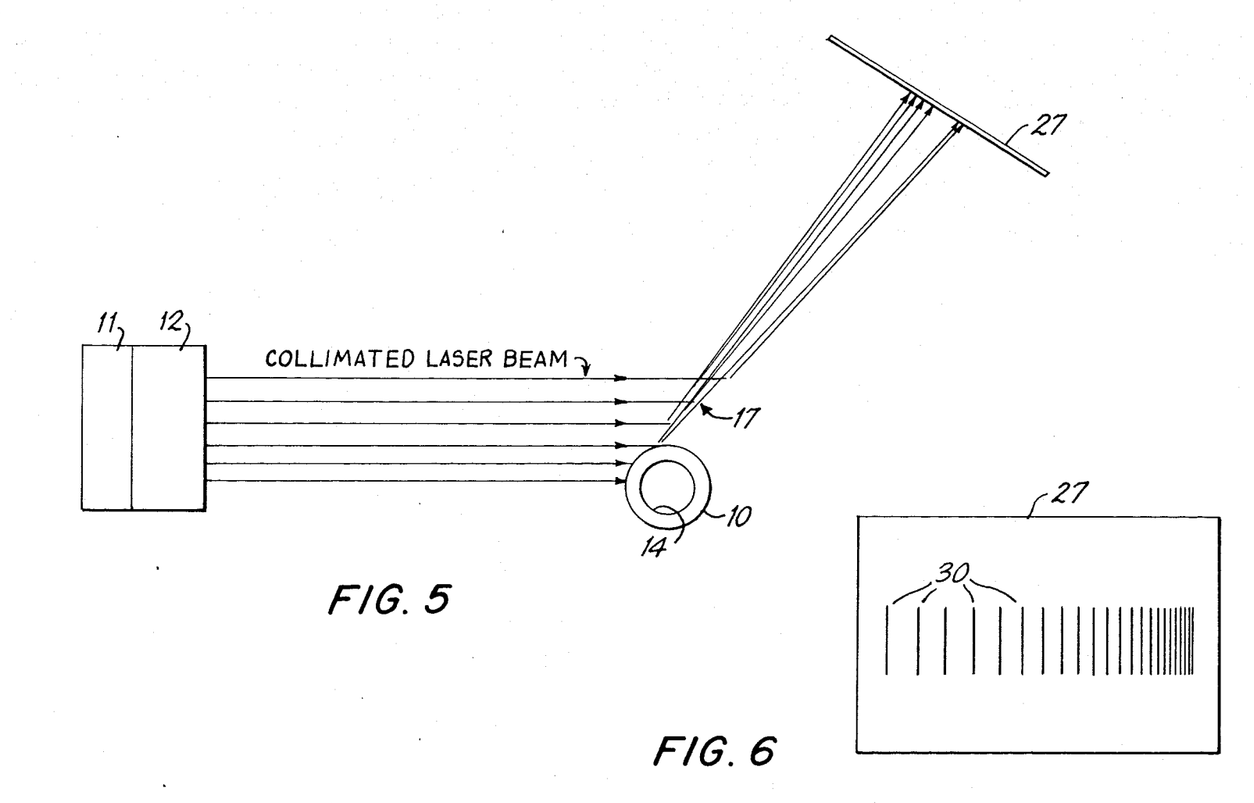
FIG. 5 is a schematic illustration of the apparatus showing how the constructive and destructive patterns of reflected/refracted light rays are obtained.
FIG. 6 is a visual display of how the patterns of light from the apparatus of FIG. 5 appear on the viewing screen.

FIG. 5 is a schematic illustration of essentially the same apparatus as shown and described in connection with FIGS. 1 and 2 but used for laser interferometry. The arrangement for doing this would look different from that shown in connection with FIG. 2 in that the lens 19 and the filter 20 would be removed. Instead a viewing screen 27 would be placed in the path of the ray bundle 17. A linear detector array, camera tube, or some similar detecting device could also be used.

A typical interferometric fringe pattern is shown in FIG. 6. The fringe pattern 30 on the viewing screen 27 is a straight line interference pattern and each change from a light area to dark line in the fringe pattern 30 would correspond to a change of one-half of a wavelength in the optical path lengths of the reflected fan and the reference fan. A linear or matrix array detector could be used in place of viewing screen 27 to sense the relative spacing of the light and dark fringe patterns to provide data to the signal processing circuitry 23. That would make it possible to measure the radius of curvature at any point along the tube. Doubling that value would give the inside bore diameter at that location.

The goals achieved by the present invention include measurement of the tube without physical contact, without the need to optically examine the tube internally along its axis and without concern for the index of refraction of the material. Moreover, the concentricity, ellipticity or uniformity of the tubing can be accounted for and indeed quantitatively determined in the analysis of the measured data. The present invention allows measurement of the inside of a tube as it exits from the manufacturing process and equipment through which it has been drawn. Moreover, the tube drawing equipment can be regulated in accordance with the data measured by the present invention. With the accurate dimensional control of the tube manufacturing process the volume of a precision bore capillary tube can be obtained.

I claim:

1. An apparatus to determine the diameter of the bore, the height of the inside wall, and/or the radius of curvature of the inside wall of a transparent or translucent tube comprising:
   a laser which provides a light beam at a wavelength for which the material being measured is transparent or translucent;
   directing means for said laser beam to aim said laser beam toward a tube location and normal to a longitudinal axis of the tube while moving the aimed beam to scan the tube transverse to the longitudinal axis;
   light detection means positioned to receive laser light polarized normal to the axis of the tube from said laser beam which laser light has been reflected or refracted by the inside wall of the tube, said light detection means capable of generating signals responsive to the light received, and
   signal processing means associated with said light detection means for processing signals to determine the position of the inside wall of the tube by means of analyzing when the signals from said reflected or refracted laser light change from being reflected by to being refracted through the inside wall of the tube.

2. The apparatus of claim 1 wherein said signal processing means includes a timer connected for activation by signals from said light detection means, said timer being operated when said laser beam changes from total reflection off the tube inside wall to refraction through the inside wall of the tube.

3. The apparatus of claim 1 wherein said directing means includes scanning means operative to traverse a scan area extending from above the tube, through the tube to below the tube in a direction normal to the axis thereof producing patterns of light as said laser beam passes through the tube wall from the outside to the inside and said patterns result from reflection of laser light off of the inside wall or refraction of laser light by the inside wall of the tube.

4. The apparatus of claim 3 wherein said signal processing means analyzes fringe patterns of overlapping fans of said laser light received from said light detection means to measure spacing of constructive and destructive interference of the laser light and rays indicative of the changes in the topography of the inside wall of the tube.

5. An instrument for finding the radius of curvature of the inside wall of a material curved about an axis which material is translucent or transparent to certain wavelengths of polarized laser light which includes:
   a laser which provides a light beam polarized normal to an axis of the curved material and at a wavelength for which the material is transparent or translucent;
   laser beam directing means for aiming said laser beam along a path normal to the axis of the curved material, and
   movement means associated with at least the curved material or said laser beam directing means for directing the path of said laser beam for traversing transverse to the axis of the curved material to change the optical influence of the curved material upon said laser light beam from total reflection off the inside wall of the curved material to refraction at the inside wall of the curved material upon intercepting the outside wall of the curved material at a height substantially equal to the height of the inside wall resulting in a measurable variation on the reflected or refracted light relative to the curvature of the inside wall of the curved material.

6. A method for finding the radius of the curvature of the inside wall of a tubular member which is transparent or translucent to certain wavelengths of laser light including the following steps:

aiming a beam of laser light so it is directed normal to an axis of a tubular member and during scanning the tubular member axis transversely with the aimed beam, said tubular member having an outside wall and inside wall;

intersecting the outside wall of the tubular member around a height substantially equal to the height of the inside wall and normal to the axis of the tubular member;

detecting when laser light polarized normal to the axis of the tubular member is totally reflected by the inside wall of the tubular member;

detecting when laser light polarized normal to the axis of the tubular member is refracted at the inside wall of the tubular member, and relating the transition point between reflection and refraction to the position of the inside wall of the tubular member.

7. The method of claim 6 with the additional step of moving at least the beam of light or the tubular member axially relative to the other for determining the radius of curvature of the inside wall at various positions along the axis of the tubular member.

8. The method of claim 6 with the additional steps of moving at least the beam of light or the tubular member traversely relative to one another so the beam of light intersects the tubular member at positions of diametrically opposed points, and producing signals spaced in time for determining the transition points at each end of the diametrically opposed points.

9. The method of claim 7 with the additional step of producing a signal at the time when the transition point is detected.

10. A method of forming a tubular member which is transparent or translucent to certain wavelengths of laser light including the following steps:

drawing a tubular member having an outside wall and an inside wall from glass heated to a molten, workable and flowable state;

aiming a beam of laser light so it is directed normal to an axis of the drawn tubular member;

scanning the tubular member transverse to the axis with the aimed beam;

intersecting the outside wall of the tubular member around a height substantially equal to the height of the inside wall and normal to the axis of the tubular member;

detecting when laser light polarized normal to the axis of the tubular member is totally reflected by the inside wall of the tubular member;

detecting when laser light polarized normal to the axis of the tubular member is refracted through the inside wall of the tubular member, and relating the transition point between reflection and refraction to the position of the inside wall of the tubular member.

11. The method of claim wherein the step of drawing produces an elongate tubular member.

12. The method of claim 10 including the steps of making multiple measurements circumferentially around said tubular member, said measurements to be used to determine concentricity and/or ellipticity.

* * * * *

UNITED STATES PATENT AND TRADEMARK OFFICE
CERTIFICATE OF CORRECTION

PATENT NO. : 4,859,861

DATED : August 22, 1989

INVENTOR(S) : S. Mersch

It is certified that error appears in the above-identified patent and that said Letters Patent is hereby corrected as shown below:

In Claim 11, line 1, after "claim", insert --10--.

Signed and Sealed this

Seventh Day of January, 1992

Attest:

HARRY F. MANBECK, JR.

*Attesting Officer*     *Commissioner of Patents and Trademarks*